Patented Dec. 3, 1929

1,737,760

UNITED STATES PATENT OFFICE

CLAUS HEUCK, OF LUDWIGSHAFEN-ON-THE-RHINE, AND PAUL ESSELMANN, OF PREM-NITZ, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

REDUCTION OF THE SWELLING CAPACITY OF HYDRATED CELLULOSE AND THE RESULTING PRODUCT

No Drawing. Application filed December 20, 1928, Serial No. 327,460, and in Germany July 25, 1927.

The present invention relates to improvements in the reduction of the swelling capacity of hydrated cellulose.

In order to reduce the swelling capacity of hydrated cellulose which is greater than that of cellulose itself, several proposals have been made. Thus, for example, additions of sulphonic acids have been made to the liquors employed for the precipitation of the hydrated cellulose from solutions thereof or the hydrated cellulose has been treated with formaldehyde but no lasting effect could be obtained thereby.

We have now found that the swelling capacity of hydrated cellulose can be considerably reduced by treating the hydrated cellulose either instantly after its precipitation or even after drying it with an aqueous solution of a water-soluble methylol compound of a carbamide preferably in the presence of slightly acid agents and adding, if desired, further compounds which assist polymerization, as for example formaldehyde. The said methylol compounds are for example those of urea or thiourea, such as mono- or di-methylol urea or dimethylol thiourea to mixtures thereof.

The acid agents referred to above can be chosen from organic acids but are preferably of a nature which is capable of furnishing a constant hydrogen-ion concentration during the polymerization. Such agents are, for example, the so-called buffer substances, such as mixtures of primary and secondary sodium phosphate, or of sodium acetate and acetic acid, the composition of which mixtures can be varied within a rather wide range of acidity in accordance with the special requirements of the materials employed.

This method of working allows a considerable reduction of the time required for drying and a reduction of the temperature required for the performance of the condensation, since the slightly acid reaction of the solution considerably accelerates the polymerization. The aqueous solutions can be applied also in admixture with certain quantities of water-soluble organic solvents, such as monohydric alcohols, water-soluble esters, glycols or mono-ethers or mono-esters of the same, glycerol, formamide, or suitable softening agents, such as glycerol triacetic ester, and if desired with admixture of wetting agents, such as soaps, sulphonated oils, salts of sulphonic acids and the like or several of the aforesaid agents. The treatment can be performed also at an elevated temperature up to 130° centigrade or while applying an elevated pressure such as 2 to 3 atmospheres or with both these features.

The effect of the aforesaid treatment of hydrated cellulose is most surprising, since it was to be expected that the foils or threads would become very brittle and considerably coarser or the single threads, for example in the case of artificial silk, would become sticky and adhere to each other, but none of the said disadvantages occurs and highly valuable products are obtained.

The following examples will further illustrate how the invention may be carried out in practice, but the invention is not limited thereto. The parts are by weight.

Example 1

100 parts of hydrated cellulose in the form of artificial silk known in the trade as viscose are dipped for an hour into a slightly heated solution of 40 parts of dimethylol urea and 0.4 part of a mixture of about 4 parts of primary and 1 part of secondary sodium phosphate in 1000 parts of water, whereupon they are subjected for 24 hours to a process of drying at from 110° to 120° centigrade. After rinsing and soaping, the silk shows an increased strength in the wet state of about 100 per cent.

Example 2

100 parts of artificial silk obtained from a solution of cellulose in cupric ammonium solution are dipped for an hour into a solution of 40 parts of dimethylol urea and 0.2 part of a mixture of about 6 parts of primary and 1 part of secondary sodium phosphate in a mixture of 950 parts of water and 50 parts of glycol monoethyl ether and then treated in the manner described in Example 1. The strength of the silk in the wet state is increased about 50 per cent by the said treatment.

What we claim is:—

1. The process of reducing the swelling capacity of hydrated cellulose which comprises acting upon hydrated cellulose with an aqueous solution of a methylol compound of a carbamide.

2. The process of reducing the swelling capacity of hydrated cellulose which comprises acting upon hydrated cellulose with a weakly acid aqueous solution of a methylol compound of a carbamide, while warming the solution.

3. The process of reducing the swelling capacity of hydrated cellulose which comprises acting upon hydrated cellulose with an aqueous solution of a methylol compound of a carbamide containing agents furnishing a constant hydrogen-ion concentration during the polymerization.

4. The process of reducing the swelling capacity of hydrated cellulose which comprises acting upon hydrated cellulose with a weakly acid aqueous solution of a methylol compound of a carbamide, comprising a water-soluble organic solvent.

5. The process of reducing the swelling capacity of hydrated cellulose which comprises acting upon hydrated cellulose with a weakly acid solution of a methylol compound of a carbamide, comprising a water-soluble organic solvent and a wetting agent.

6. The process of reducing the swelling capacity of hydrated cellulose which comprises acting upon hydrated cellulose with a weakly acid aqueous solution of a methylol compound of a carbamide comprising a water-soluble organic solvent, a wetting agent and a softening agent.

7. The process of reducing the swelling capacity of hydrated cellulose which comprises acting upon hydrated cellulose with a weakly acid aqueous solution of a methylol urea and a buffer substance.

8. The process of reducing the swelling capacity of hydrated cellulose which comprises acting upon hydrated cellulose with a weakly acid solution of a methylol urea, a buffer substance and a water-soluble organic solvent.

9. As new articles of manufacture artificial threads comprising hydrated cellulose and a water-insoluble condensation product of a methylol compound of a carbamide, which threads possess a small tendency of swelling.

10. As new articles of manufacture artificial threads comprising hydrated cellulose and a condensation product of a methylol urea, which threads possess a small tendency of swelling.

In testimony whereof we have hereunto set our hands.

CLAUS HEUCK.
PAUL ESSELMANN.